(12) United States Patent
Chang et al.

(10) Patent No.: US 7,557,879 B2
(45) Date of Patent: Jul. 7, 2009

(54) TRANSFLECTIVE LIQUID CRYSTAL DISPLAY, FLAT PANEL DISPLAY DEVICE, AND ELECTRONIC APPARATUS

(75) Inventors: Wei-Chih Chang, Jhudong Township (TW); Yu-Chi Chang, Hukou Township (TW); Norio Oku, Taipei (TW)

(73) Assignee: TPO Displays Corp, Chu-Nan (TW)

( * ) Notice: Subject to any disclaimer, the term of this patent is extended or adjusted under 35 U.S.C. 154(b) by 341 days.

(21) Appl. No.: 11/360,794

(22) Filed: Feb. 22, 2006

(65) Prior Publication Data

US 2007/0195235 A1    Aug. 23, 2007

(51) Int. Cl.
G02F 1/1333 (2006.01)
G02F 1/1335 (2006.01)

(52) U.S. Cl. ............... 349/114; 349/56; 349/84; 349/113; 349/122; 349/138

(58) Field of Classification Search .......... 349/56, 349/84, 113, 114, 122, 138
See application file for complete search history.

(56) References Cited

U.S. PATENT DOCUMENTS

| | | | |
|---|---|---|---|
| 6,195,140 B1 | 2/2001 | Kubo et al. | |
| 6,281,952 B1 | 8/2001 | Okamoto et al. | |
| 6,295,109 B1 | 9/2001 | Kubo et al. | |
| 6,330,047 B1 | 12/2001 | Kubo et al. | |
| 6,452,654 B2 | 9/2002 | Kubo et al. | |
| 6,519,012 B1 * | 2/2003 | Helbing et al. | 349/30 |
| 6,606,139 B2 * | 8/2003 | Yoshii et al. | 349/114 |
| 6,853,422 B2 | 2/2005 | Chung | |
| 7,268,845 B2 * | 9/2007 | Oizumi | 349/119 |
| 2004/0090576 A1 | 5/2004 | Chuang | |
| 2004/0201795 A1 * | 10/2004 | Paukshto | 349/96 |
| 2006/0197894 A1 * | 9/2006 | Higa et al. | 349/114 |

FOREIGN PATENT DOCUMENTS

CN   1448764   10/2003
CN   1683967   10/2005

* cited by examiner

*Primary Examiner*—Frank G Font
*Assistant Examiner*—Jerry Blevins
(74) *Attorney, Agent, or Firm*—Liu & Liu (57) ABSTRACT

A transflective liquid crystal display module is provided. The transflective LCD includes a backlight unit for providing a light, an active matrix substrate, an opposite substrate with an internal reflector disposed between the active matrix substrate and the backlight unit, an optical film disposed on the opposite substrate, and a liquid crystal layer filled between the active matrix substrate and the optical film. In the transflective LCD of the present invention, the light provided by the backlight unit is reflected back by the internal reflector such that the light provided by the backlight unit can be recycled. Furthermore, a flat panel display device and an electronic apparatus are also provided.

19 Claims, 7 Drawing Sheets

TRANSFLECTIVE LIQUID CRYSTAL DISPLAY, FLAT PANEL DISPLAY DEVICE, AND ELECTRONIC APPARATUS

BACKGROUND OF THE INVENTION

1. Field of Invention

The present invention relates to a liquid crystal display. More particularly, the present invention relates to a transflective LCD.

2. Description of Related Art

To match the life style of modern people, video or imaging equipment is becoming lighter and slimmer. Although the conventional cathode ray tube (CRT) has many advantages, the design of the electron gun renders it heavy and bulky. Moreover, there is always some risk of hurting viewer's eyes due to the production of some harmful radiation. With big leaps in the techniques in manufacturing semiconductor devices and opto-electronic devices, flat panel displays such as liquid crystal displays (LCD), organic light-emitting displays (OLED) and plasma display panels (PDP) has gradually become the mainstream display products. According to the light source used, a liquid crystal display can be classified into three types: reflective LCD, transmissive LCD and transflective LCD. Taking a transflective LCD as an example, the transflective LCD mainly includes a transflective liquid crystal panel and a backlight unit. The transflective LCD panel includes a thin film transistor array, a color filter and a liquid crystal layer sandwiched therebetween. The backlight unit provides a surface light source to illuminate the transflective LCD panel for displaying images. More specifically, the thin film transistor array includes a plurality of pixels, each pixel has a transmissive region and a reflective region respectively, and wherein the thickness of liquid crystal layer located above the transmissive region is often different from the thickness of liquid crystal layer located above the reflective region.

Figure 1:
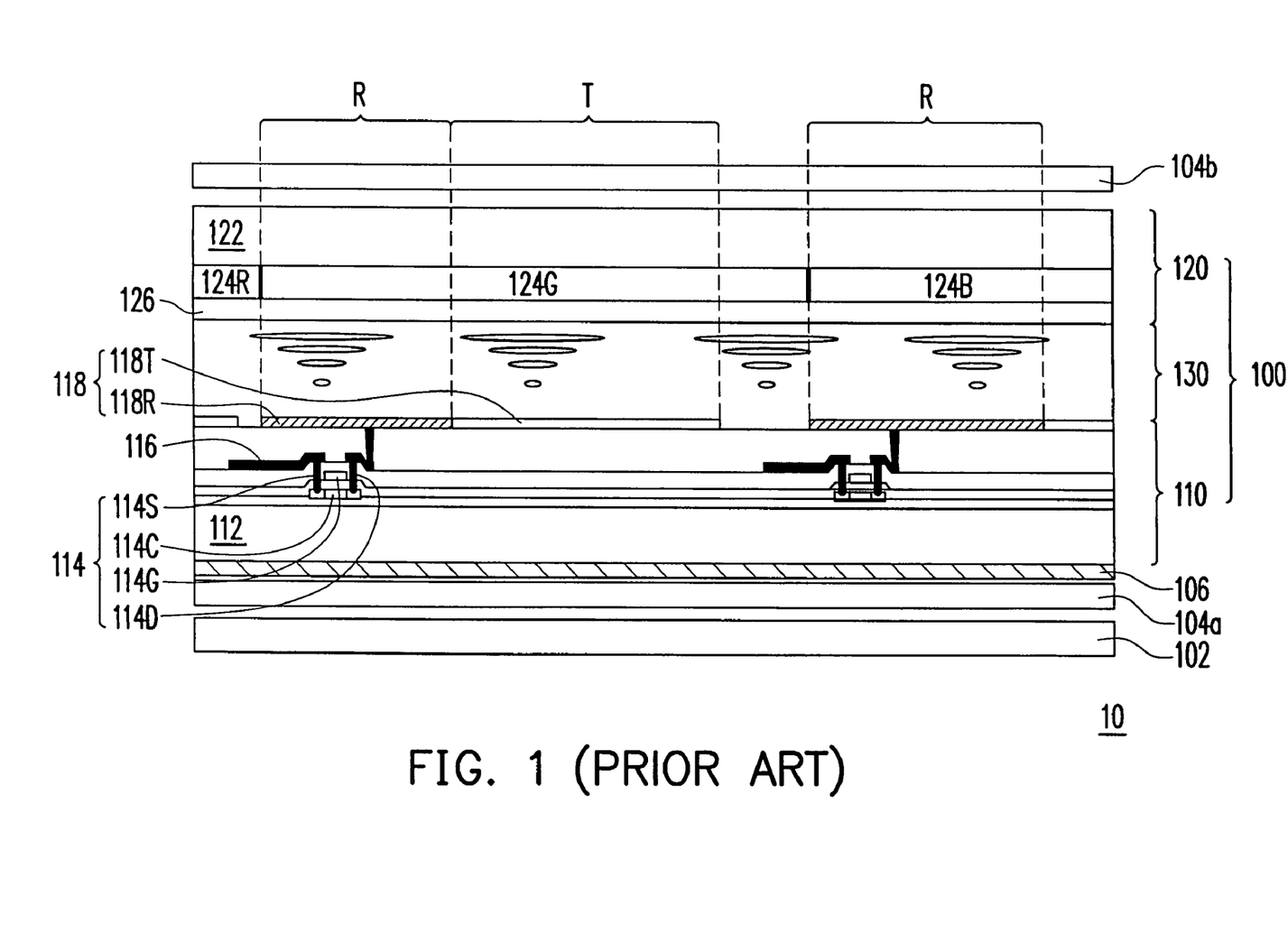
FIG. 1 schematically illustrates a cross-sectional view of a conventional liquid crystal display.

FIG. 1 schematically illustrates a cross-sectional view of a conventional liquid crystal display. Referring to FIG. 1, the conventional LCD 10 includes a transflective LCD panel 100, a backlight unit 102 disposed under the transflective LCD panel 100, a polarizer 104a disposed between the transflective LCD panel 100 and the backlight unit 102, a polarizer 104b disposed above the transflective LCD panel 100, and a quarter wave plate 106 disposed between the transflective LCD panel 100 and the polarizer 104a. The light is polarized to the desired phase by the polarizer 104a implemented between the backlight unit 102 and the transflective LCD panel 100.

As shown in FIG. 1, the conventional transflective LCD panel 100 includes a thin film transistor array substrate (TFT array substrate) 110, a color filter substrate 120 disposed above the TFT array substrate 110, and a liquid crystal layer 130 filled between the TFT array substrate 110 and the color filter substrate 120. As shown in FIG. 1, the TFT array substrate 110 includes a transparent substrate 112, a plurality of thin film transistors (TFT) 114, a plurality of scan lines (not shown), a plurality of data lines 116, and a plurality of pixel electrodes 118. The TFT 114, the scan lines, the data lines 116, and the pixel electrodes 118 are all arranged over the transparent substrate 112. The layout of the TFT 114, the scan lines, the data lines 116, and the pixel electrodes 118 should be known by the ordinary skilled artisans, and are not described in detail. Each TFT 114 includes a gate electrode 114G electrically connected to the corresponding scan line, a source electrode 114S electrically connected to the corresponding data line 116, a drain electrode 114D electrically connected to the corresponding pixel electrode 118, and a channel layer 114C capable of turning on or off by a bias (e.g. $V_{gh}$ or $V_{gl}$) that is applied to the gate electrode 114G.

As shown in FIG. 1, the pixel electrodes 118 includes a transparent electrode 118T and a reflective electrode 118R electrically connected to each other such that a plurality of transmissive regions T and reflective regions R of the transflective LCD panel 100 are defined. In detail, the transparent electrodes 118T permit light emitted from the backlight unit 102 passing through, and the reflective electrodes 118R reflect ambient light. Generally, the transparent electrodes 118T are made of indium tin oxide (ITO), indium zinc oxide (IZO), or other transparent conductive materials; the reflective electrodes 118R are made of metals or other reflective conductive materials.

Still referring to FIG. 1, the color filter substrate 120 includes a transparent substrate 122, a plurality of color filters 124R, 124G, and 124B, and a common electrode 126, wherein the color filters 124R, 124G, and 124B are disposed over the substrate 122, and the common electrode 126 are disposed above the color filters 124R, 124G, and 124B. Usually, the common electrode 126 is made of ITO, IZO, or other transparent conductive materials.

In the conventional LCD 10 described above, a portion of light provided by the backlight unit 102 is reflected back by the reflective electrodes 118R on the TFT array substrate 110; the other portion of light provided by the backlight unit 102 passes through the transparent electrodes 118T. In detail, the light reflected back by the reflective electrodes 118R is cut by the quarter wave plate 106 above the backlight unit 102. Therefore, the light reflected back by the reflective electrodes 118R can not be recycled. In addition, the manufacturing time and costs can not be reduced significantly because the polarizer 104a, the analyzer 104b and the quarter wave plate 106 are necessary for image displaying.

SUMMARY OF THE INVENTION

The present invention is directed to a transflective LCD, a flat panel display, and an electronic apparatus.

In one aspect, the present invention is directed to a liquid crystal panel having an internal reflective surface that is provided on a panel substrate that is different from the panel substrate on which the pixel switching device matrix (e.g., a TFT array) is provided, to enhance the image quality of the liquid crystal panel. In one embodiment, the internal reflective surface is placed on the same substrate that supports the color filters. In another embodiment, the internal reflective surface is placed on the substrate that is positioned adjacent a backlight unit. In one embodiment, the liquid crystal panel is of the transflective type.

In another aspect, an optical film may be provided internal within the liquid crystal panel to enhance the image quality of the liquid crystal panel. The internal optical film may be, for example, a polarizer, or an optical compensator. In one embodiment, the internal optical film may be supported by the substrate that supports an internal reflective surface.

As embodied and broadly described herein, in one embodiment, the present invention provides a liquid crystal display having an internal reflective surface, e.g., a transflective LCD. The transflective LCD includes a backlight unit for providing a light, a liquid crystal panel comprising a pixel switching device matrix substrate such as an active matrix substrate, an opposite substrate with an internal reflector disposed between the active matrix substrate and the backlight unit, an optical film such as internal polarizer or optical compensator disposed on the opposite substrate, and a liquid crystal layer filled between the active matrix substrate and the optical film. In the transflective LCD of the present invention, a portion of the light provided by the backlight unit is reflected back by the internal reflector such that the light provided by the backlight unit can be recycled.

As embodied and broadly described herein, the present invention also provides a flat panel display device. The flat panel display device includes the transflective LCD mentioned above, and a driving circuit electrically connected to the transflective LCD.

As embodied and broadly described herein, the present invention further provides an electronic apparatus. The electronic apparatus includes a flat panel display device mentioned above, a user interface, and a control circuit electrically connected to the flat panel display device and the user interface.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the present invention, a novel liquid crystal display panel is proposed. By way of example and not limitation, an inventive transflective LCD is proposed. In the transflective LCD of the present invention, an opposite substrate with an internal reflector is disposed between an active matrix substrate and a backlight unit such that the light provided by the backlight unit can be reflected back by the internal reflector for further recycling. In addition, a quarter wave plate used in FIG. 1 is not necessary in the transflective LCD of the present invention because an optical film is formed over the opposite substrate and between the active matrix substrate and the opposite substrate. As a result, the light reflected back by the internal reflector can be re-used without cutting by the quarter wave plate.

Figure 2:
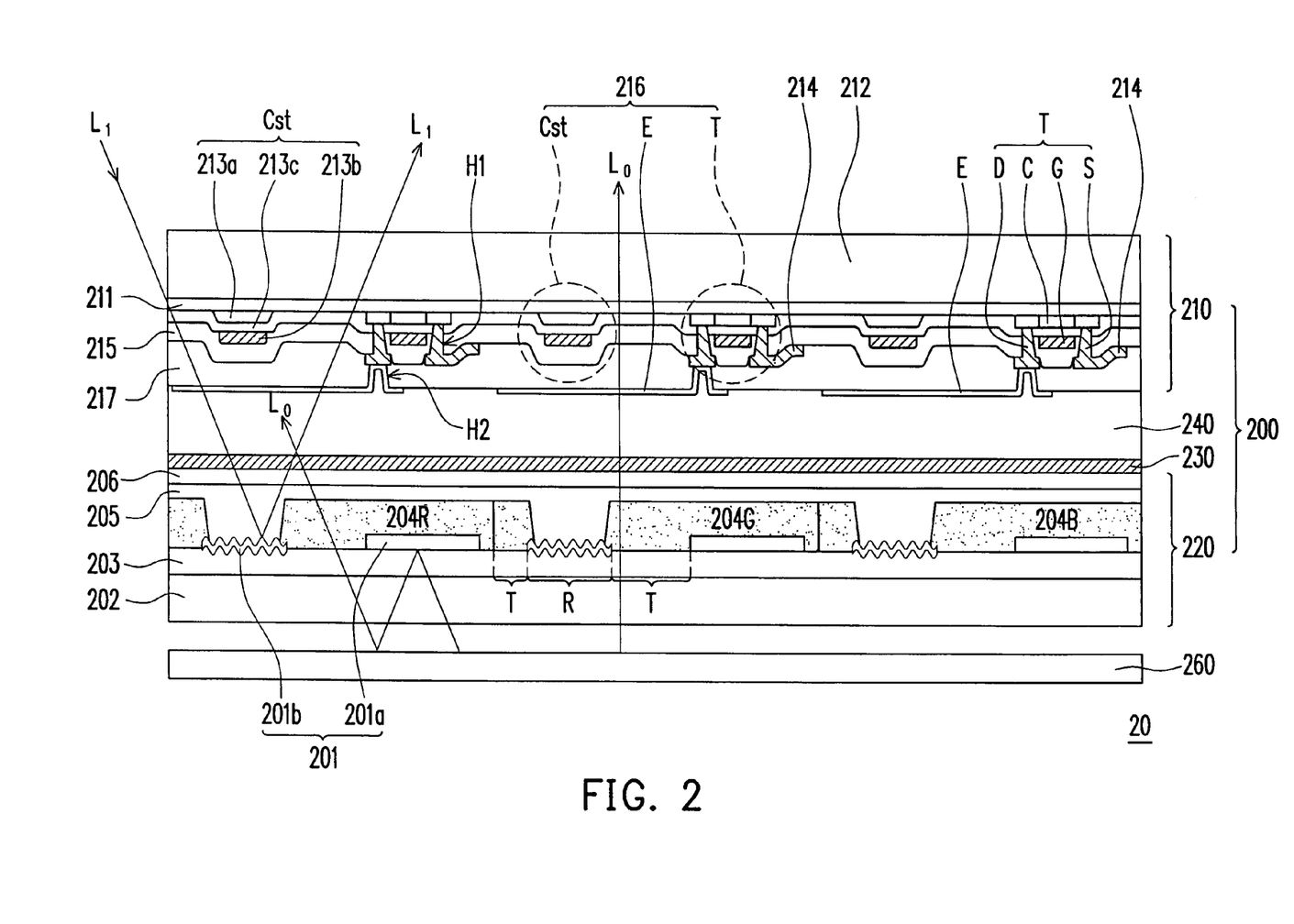
FIG. 2 schematically illustrates a cross-sectional view of a liquid crystal display according to the first embodiment of the present invention.

FIG. 2 schematically illustrates a cross-sectional view of a liquid crystal display according to the first embodiment of the present invention. Referring to FIG. 2, the transflective LCD 20 according to the first embodiment of the present invention is provided. The transflective LCD 20 includes a backlight unit 260 for providing a light $L_0$, and an LCD panel 200. The LCD panel 200 comprises a substrate on which an array of pixel switching matrix is disposed, e.g., an array of TFTs for an active matrix substrate 210, an opposite substrate 220 with an internal reflector 201, an internal polarizer 230 disposed on the opposite substrate 220, and a liquid crystal layer 240. As shown in FIG. 2, the liquid crystal layer 240 is filled between the active matrix substrate 210 and the internal polarizer 230. The internal polarizer 230 can adjust the phase of an ambient light L1 and image quality of the reflective region R can be improved. It should be noted that, the opposite substrate 220 is disposed between the active matrix substrate 210 and the backlight unit 260 and a portion of the light $L_0$ provided by the backlight unit 260 is reflected back by the internal reflector 201. The architecture of the transflective LCD 20 is quite different from the conventional transflective LCD 10 (shown in FIG. 1). Specifically, the arrangement of the backlight unit 260, the active matrix substrate 210, and the opposite substrate 220 is novel.

The detail structures of backlight unit 260, the active matrix substrate 210 and the opposite substrate 220 are discussed below. Referring to FIG. 2, the backlight unit 260 of the present embodiment may be an edge-lighting type backlight module, a direct type backlight module, cathode fluorescence flat lamp (CCFFL), or organic electro-luminescence device (OEL device). In either the edge-lighting type backlight module or the direct type backlight module, the light source may be light emitting diode array (LED array), cold cathode fluorescence lamp (CCFL), or other light source.

Still referring to FIG. 2, the active matrix substrate 210 includes a first substrate 212 (e.g., a transparent substrate such as a glass substrate), a plurality of control lines 214 disposed on the first substrate 212, a plurality of thin film transistor 216, and a plurality of storage capacitance Cst disposed on the first substrate 212 and arranged in array, wherein each of the thin film transistor 216 is electrically connected to the corresponding control lines 214. In the active matrix substrate 210, the control lines 214 disposed on the first substrate 212 may be scan lines and data lines. In the present embodiment, the active matrix substrate 210 may be fabricated by low temperature poly-silicon (LTPS) technology or other array processes. Moreover, the storage capacitance Cst includes a first electrode 213a, a second electrode 213b, and a dielectric layer 213c disposed between the first electrode 213a and the second electrode 213b.

It should be noted that the first electrodes 213a and the second electrodes 213b may be made of ITO, IZO, or other transparent conductive materials such that the light provided from the backlight unit 260 can pass through the storage capacitance Cst. As a result, the transmittance of the active matrix substrate 210 can achieve about 85%~90%. However, the material of the first electrodes and the second electrodes is not limited to be transparent; i.e. the first electrodes 213a and/or the second electrodes 213b may be opaque electrode. For example, the first electrodes 213a may be made of poly-silicon and the second electrodes 213b may be made of opaque metal.

Although the thin film transistors 216 illustrated in FIG. 2 are top-gate transistors and the material of the channel layers C is low temperature poly-silicon fabricated by excimer laser anneal (ELA) process, the structure of the thin film transistors 216 and the material of the channel layers C are only illustrated for elaboration and not limited by FIG. 2. In other words, the thin film transistors T of the present invention may be bottom gate transistors, also, the material of the channel layers C may be amorphous silicon fabricated by chemical vapor deposition.

In the conventional transflective LCD 10 (shown in FIG. 1), the transmissive regions T and the reflective regions R are defined respectively by the transparent electrodes 118T and the reflective electrodes 118R the same side of the LCD panel 100 on the TFT array substrate 110. On the contrary, in the transflective LCD 20 of the present invention, the transmissive regions T and the reflective regions R are defined on the opposite side of the LCD panel 200, on the side of the opposite substrate 220 instead of the active matrix substrate 210 in the illustrated embodiment.

Referring to FIG. 2, the opposite substrate 220 includes a second substrate 202 (e.g., a transparent substrate such as a glass substrate), a polymer layer 203, a plurality of color filters 204R, 204G, 204B, an over-coating 205, and a common electrode 206. The internal reflector 201 is disposed on the polymer layer 203. The polymer layer 203 is disposed on the second substrate 202. The color filters 204R, 204G, 204B are disposed on the polymer layer 203 and the internal reflector 201 such that a portion of the internal reflector 201 is covered by the color filters 204R, 204G, 204B. The over-coating 205 is disposed on the color filters 204R, 204G, 204B and the internal reflector 201 that is not covered by the color filters 204R, 204G, 204B. In addition, the common electrode 206 is disposed on the over-coating 205 and the internal polarizer 230 is disposed on the common electrode 206.

As shown in FIG. 2, the internal reflector 201 includes a plurality of first reflective patterns 201a for reflecting the light $L_0$ provided by the backlight unit 260 and a plurality of second reflective patterns 201b for defining a plurality of reflective regions R on the opposite substrate 220, i.e. ambient light $L_1$ can be reflected by the second reflective patterns 201b. (While the illustrated embodiment shows the internal reflector 201 having a discontinuous structure comprising separate sections 201a and 201b, it is contemplated that for certain applications dependent on the image quality desired, the internal reflector may have a continuous structure across the planar area.) Specifically, regions that are not occupied by the internal reflector 201 are defined as transmissive regions T. It is noted that, the first reflective patterns 201a facilitate recycling of the light $L_0$ so as to improve the display quality of the transmissive regions T. The reflective patterns 201a have a smooth undersurface towards the backlight unit 260. The reflective patterns 201a are covered by the color filters, but does not need to be.

In a embodiment of the present invention, a portion surface of the polymer layer 203 covered by the second reflective patterns 201b is bumpy and the second reflective patterns 201b is conformal with the covered (bumpy) surface of the polymer layer 203. The bumpy surface of the polymer layer 203 can facilitate reflectivity of the second reflective patterns 201b so as to improve the display quality of the reflective regions R.

Figure 3:
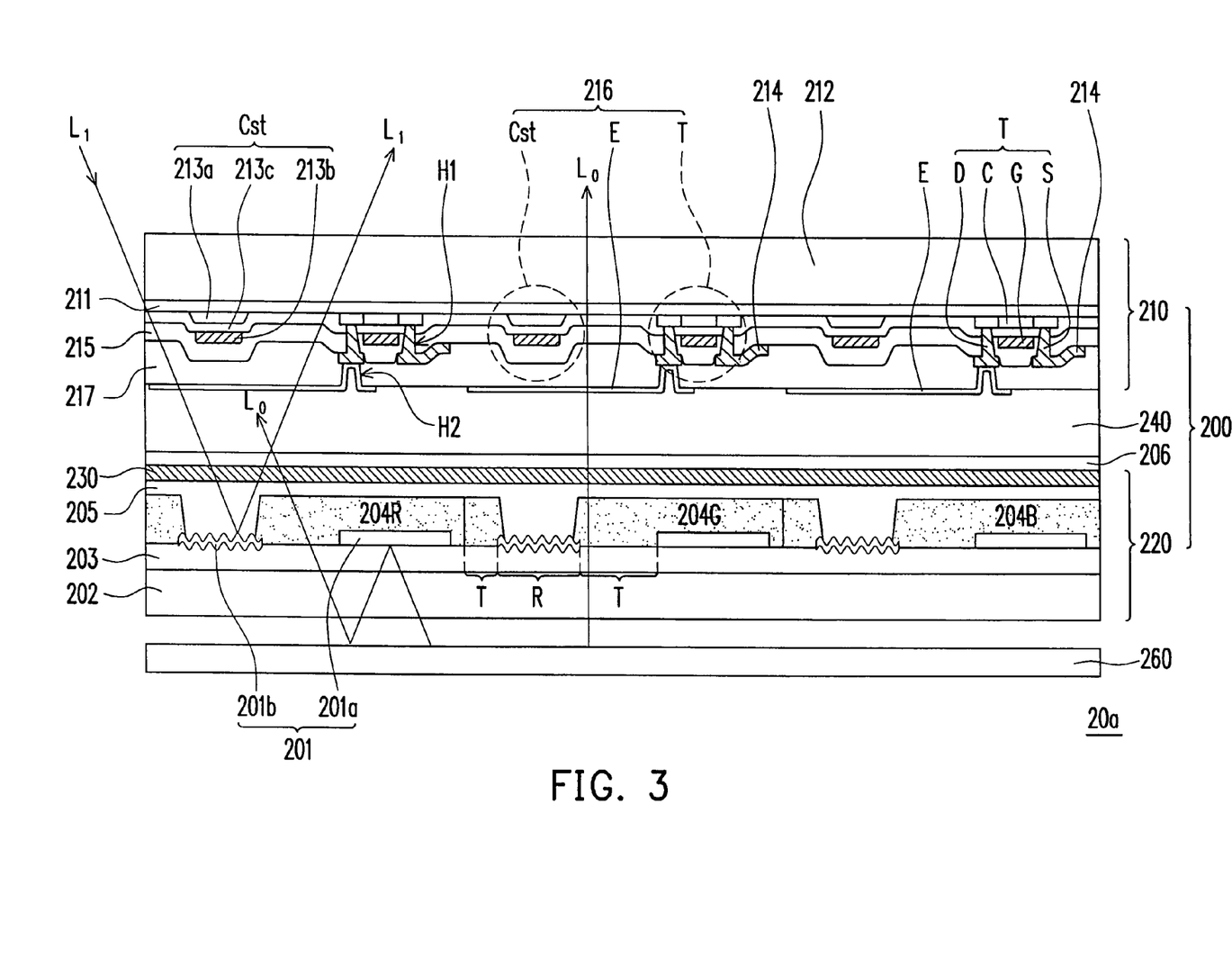
FIG. 3 schematically illustrates a cross-sectional view of a liquid crystal display according to the second embodiment of the present invention.

FIG. 3 schematically illustrates a cross-sectional view of a liquid crystal display according to the second embodiment of the present invention. Referring to FIG. 3, the transflective LCD 20a of the present embodiment is similar with the transflective LCD 20 of the first embodiment except that the position of the common electrode 206 and the internal polarizer 230. In the present embodiment, the internal polarizer 230 is disposed on the over-coating 205 and the common electrode 206 is disposed on the internal polarizer 230. It should be noted that, position of the internal polarizer 230 is not limited by FIG. 2 and FIG. 3, the internal polarizer also can be a discontinuous structure, wherein the discontinuous internal polarizer comprises separate sections, each section is disposed between any two laminated layers and located above the second reflective patterns 201b.

Figure 4:
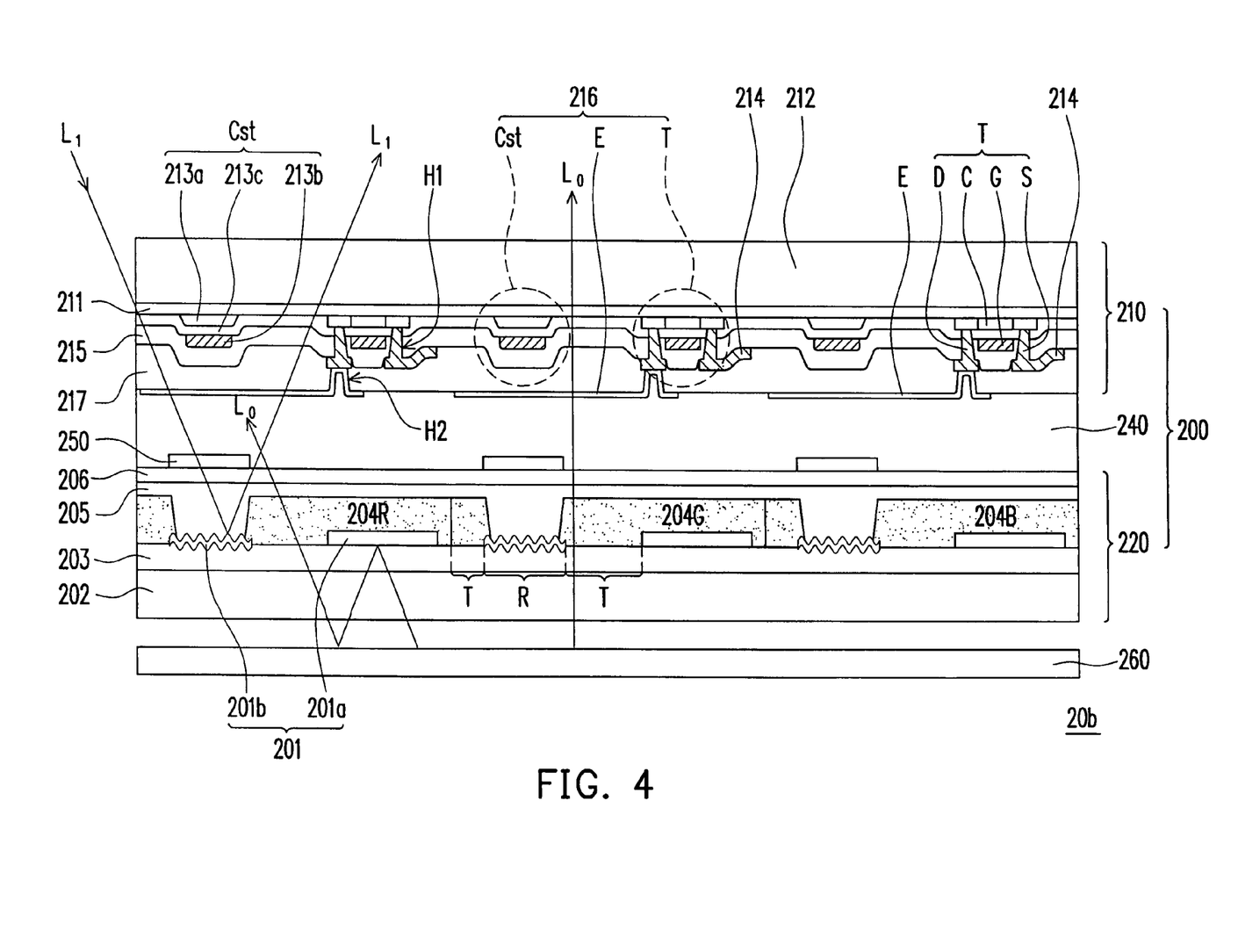
FIG. 4 schematically illustrates cross-sectional views of a liquid crystal display according to another embodiments of the present invention.

FIG. 4 schematically illustrates cross-sectional views of a liquid crystal display according to another embodiments of the present invention. Referring to FIG. 4, the transflective LCD 20b of the present embodiment is similar with the transflective LCD 20 of the first embodiment except for the disposition of the optical compensators 250 instead of an internal polarizer. In the present embodiment, the optical compensators 250 are disposed on the common electrode 206 and located above the second reflective patterns 201b such that the phase of the ambient light $L_1$ can be compensated by the optical compensators 250. Image quality of the reflective region R can be improved.

Figure 5:
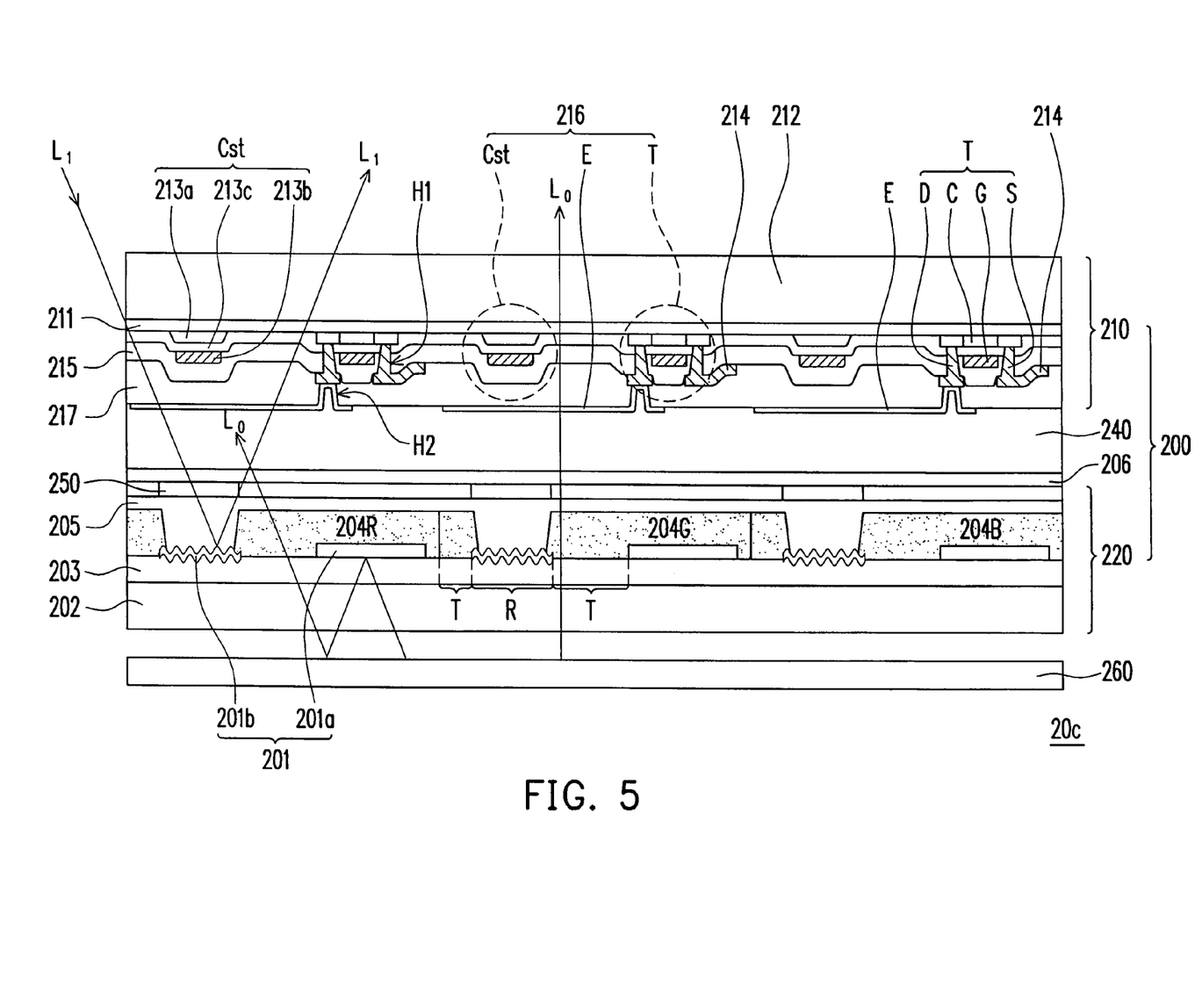
FIG. 5 schematically illustrates a block diagram of a flat panel display device according to the various embodiments of the present invention.

Referring to FIG. 5, the transflective LCD 20c of the present embodiment is similar with the transflective LCD 20a of the second embodiment except for the disposition of the optical compensators 250 instead of an internal polarizer. In the present embodiment, the optical compensators 250 are disposed on the second reflective patterns 201b such that the phase of the ambient light $L_1$ can be compensated by the optical compensators 250. Image quality of the reflective region R can be improved. It should be noted that, position of the optical compensators 250 is not limited by FIG. 4 and FIG. 5, the optical compensators 250 may be disposed between any two laminated layers located above the second reflective patterns 201b.

Figure 6:
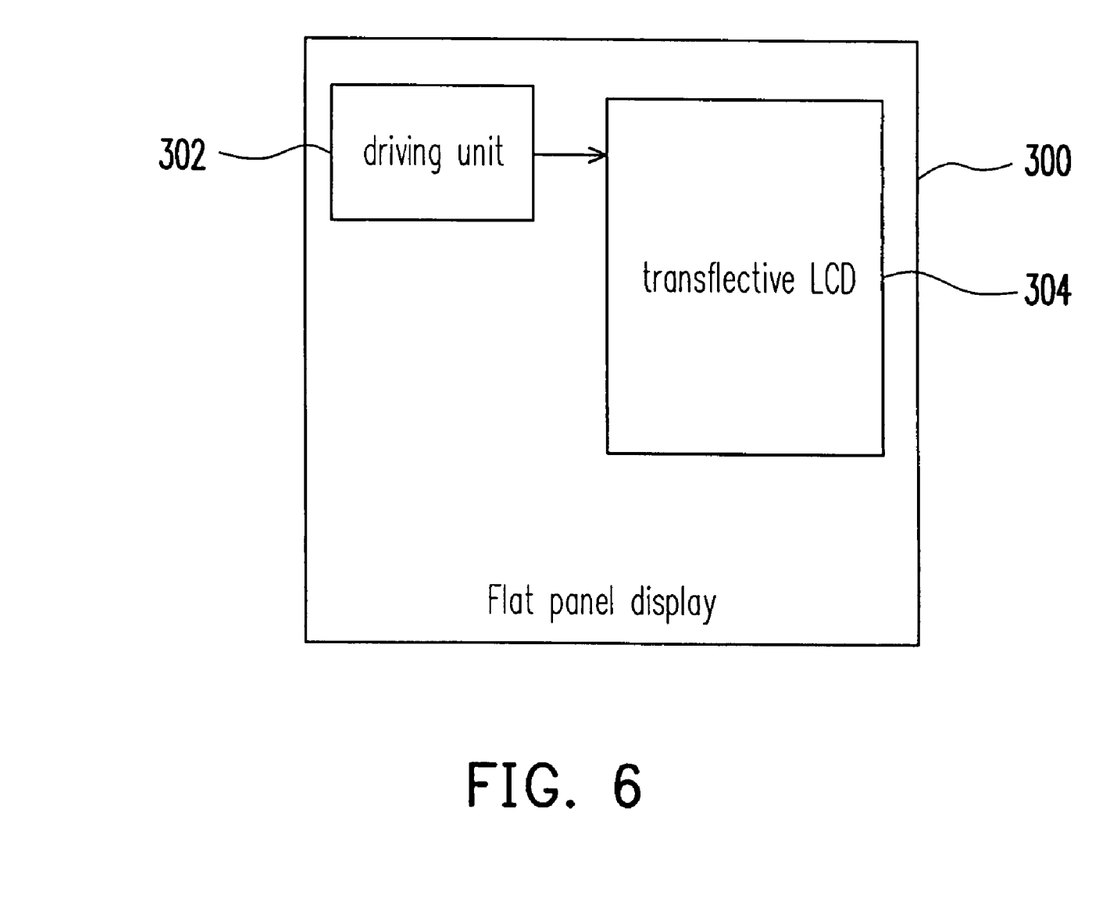
FIG. 6 schematically illustrates a block diagram of a flat panel display device according to the various embodiments of the present invention.

In general, the LCD of the present invention as described above can be applied to a flat panel display device, which may be further implemented into an electronic apparatus. FIG. 6 schematically illustrates a block diagram of a flat panel display device according to the various embodiments of the present invention. In FIG. 6, the flat panel display device 300, in general, can include a driving unit 302 and a transflective LCD 304 of the present invention as described above. The driving unit 302 includes source driver, gate driver, and control board electrically connected to the transflective LCD 304 through the source driver and gate driver. Generally, the driving unit 302 may be fabricated by chip-on-glass technology (COG technology), chip-on-board technology (COB technology), tape automated bonding technology (TAB technology), or chip-on-film technology (COF technology).

Figure 7:
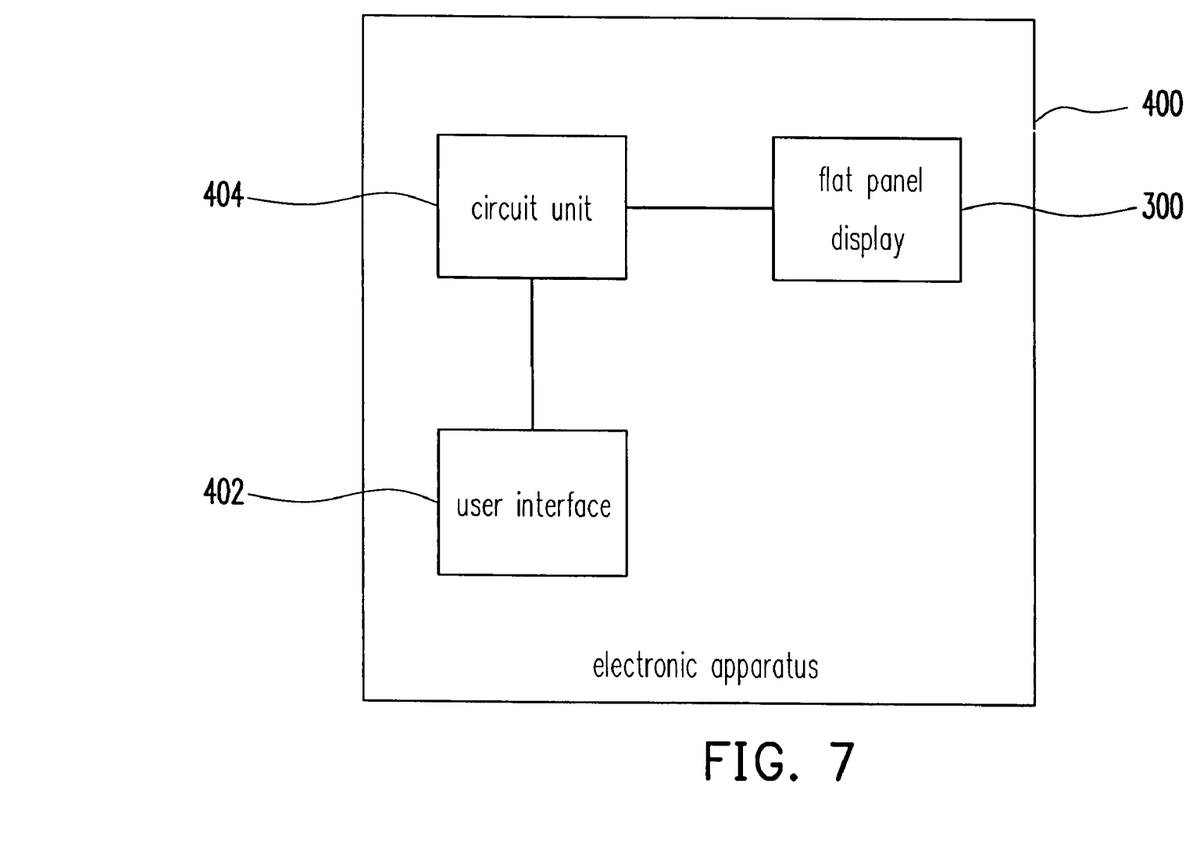
FIG. 7 schematically illustrates a block diagram of a general electronic apparatus according to the various embodiments of the present invention.

FIG. 7 schematically illustrates a block diagram of a general electronic apparatus according to the various embodiments of the present invention. In FIG. 7, the electronic apparatus 400, such as a mobile phone, an LCD television set, a computer system, a game player, or a device with a display region, and so on, includes a user interface 402, a circuit unit 404, and a flat panel display 300 shown in FIG. 6.

The circuit unit 404 is electrically connected to the user interface 402 and the display 300, so that the user can use the electronic apparatus 400, and the information is display on the flat panel display 300. In other words, the flat panel display 300 of the present invention can be implemented into any electronic apparatus to serving as the display unit.

According to foregoing descriptions of the present invention, the internal reflector is formed on the opposite substrate to define reflective regions and transmissive regions of the transflective LCD panel. Because the opposite substrate is arranged between the backlight unit and the active matrix substrate, the light primarily traveling along the direction toward the LCD panel can be reflected by the reflector back to the backlight unit for recycling use. As a result, the aperture ratio of the LCD panel of the present invention can be effectively improved. In addition, the optical film (e.g., an internal polarizer or an optical compensator) is disposed at the inner surface of the opposite substrate and no quarter wave plate is required to attach on the outer surface of the opposite substrate. In this way, the light reflected by the internal reflector can be re-used effectively.

While the illustrated embodiments show the optical film supported on the opposite substrate, the optical film (e.g., a polarizer or optical compensator) may be supported on the matrix substrate. While the optical film is shown deployed in connection with an internal reflector, the internal optical film may be used independent of an internal reflector. While the pixel switching device substrate is shown to be an active matrix substrate, other types of pixel switching device may be supported on the matrix substrate. The internal reflector aspect and/or the internal optical film aspect may be deployed in connection with transmissive type and/or reflective type LCD, in addition to the illustrated transflective type LCD.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display panel, comprising:
   a matrix substrate;
   an opposite substrate supporting an internal reflector;
   a liquid crystal layer provided between the matrix substrate and the opposite substrate;
   wherein the internal reflector comprises:
      a plurality of first reflective patterns reflecting light not from the liquid crystal layer; and
      a plurality of second reflective patterns reflecting light from the liquid crystal layer, wherein the first reflective patterns and the second reflective patterns are different.

2. The liquid crystal display panel of claim 1, wherein the matrix substrate comprises an array of pixel switching devices supported on a first substrate.

3. The liquid crystal display panel of claim 2, wherein the pixel switching devices comprises thin film transistors.

4. The liquid crystal display panel of claim 1, wherein the opposite substrate comprises a plurality of color filters supported on a second substrate.

5. The liquid crystal display panel of claim 4, wherein a portion of the internal reflector is covered by the color filters.

6. The liquid crystal display panel of claim 5, wherein:
   the plurality of first reflective patterns is disposed towards away from the liquid crystal layer reflecting light from a direction away from the liquid crystal layer, at least part of the first reflective patterns is covered by the color filters; and
   the plurality of second reflective patterns is disposed towards the liquid crystal layer reflecting light from the direction of the liquid crystal layer, which defines a plurality of reflective regions on the opposite substrate.

7. The liquid crystal display panel of claim 6, wherein the optical film comprises at least one of an internal polarizer or an optical compensator.

8. The liquid crystal display panel of claim 6, wherein optical film comprises an internal polarizer, wherein the internal polarizer comprises separate sections, each section associated with and positioned in relation to a second reflective pattern.

9. The liquid crystal display panel of claim 6, wherein the optical film comprises an optical compensator, wherein the optical compensator comprises separate compensator sections, each compensator section associated with and positioned in relation to a second reflective pattern.

10. The liquid crystal display panel of claim 6, wherein the first reflective patterns and the second reflective patterns are discontinuous.

11. The liquid crystal display panel of claim 6, wherein the second reflective patterns are bumpy.

12. The liquid crystal display panel of claim 5, wherein the opposite substrate further comprises:
   a polymer layer supported on the second substrate, wherein the polymer layer supports the color filters.

13. The liquid crystal display panel as in claim 12, further comprising an over-coating disposed on the color filters and portion of the internal reflector not covered by the color filters.

14. The liquid crystal display panel as in claim 13, further comprising:
   an optical film disposed on the over-coating; and
   a common electrode disposed on the optical film.

15. The liquid crystal display panel as in claim 1, wherein the liquid crystal display panel is of a transflective type, wherein a portion of a first external light directed at the opposite substrate from away the liquid crystal layer is transmitted through the opposite substrate and another portion of the first external light directed at the opposite substrate from away the liquid crystal layer is reflected from a first section of the internal reflector, and a portion of a second external light directed at the opposite substrate from the liquid crystal layer is reflected from a second section of the internal reflector.

16. A liquid crystal display, comprising:
   an liquid crystal display panel as in claim 1;
   a backlight module the liquid crystal display panel, on a side adjacent the opposite substrate.

17. A flat panel display device, comprising:
   an liquid crystal display as recited in claim 16; and
   a driving circuit, operatively coupled to the liquid crystal display.

18. An electronic apparatus, comprising:
   a flat panel display device as recited in claim 17;
   an user interface; and a control circuit, operatively coupled to the flat panel display device and the user interface.

19. A liquid crystal display panel comprising:

a matrix substrate;

an opposite substrate supporting an internal reflector, wherein the opposite substrate comprises a plurality of color filters supported on a second substrate, wherein a portion of the internal reflector is covered by the color filters;

a liquid crystal layer provided between the matrix substrate and the opposite substrate;

wherein the internal reflector comprises:

a plurality of first reflective patterns towards away from the liquid crystal layer reflecting light from a direction away from the liquid crystal layer, at least part of the first reflective patterns is covered by the color filters; and a plurality of second reflective patterns towards the liquid crystal layer reflecting light from the direction of the liquid crystal layer, which defines a plurality of reflective regions on the opposite substrate, wherein the second reflective patterns are bumpy;

an optical film, disposed on the opposite substrate; and a polymer layer supported on the second substrate, wherein the polymer layer supports the internal reflector, and wherein the surface of the polymer layer adjacent the second reflective patterns is bumpy and the second reflective patterns are conformal with the bumpy surface of the polymer layer.

* * * * *